US009024941B2

(12) United States Patent
Itai

(10) Patent No.: US 9,024,941 B2
(45) Date of Patent: May 5, 2015

(54) SEQUENTIALLY DISPLAYING VIRTUAL ENDOSCOPIC IMAGES BY SETTING AN OBSERVATION PATH TO COMPENSATE FOR A CURVED REGION OF THE TUBULAR STRUCTURE

(75) Inventor: Yoshinori Itai, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 713 days.

(21) Appl. No.: 13/303,839

(22) Filed: Nov. 23, 2011

(65) Prior Publication Data

US 2012/0136208 A1  May 31, 2012

(30) Foreign Application Priority Data

Nov. 26, 2010  (JP) .................................. 2010-263258

(51) Int. Cl.
G06T 15/00 (2011.01)
G06T 19/00 (2011.01)

(52) U.S. Cl.
CPC ........... *G06T 19/003* (2013.01); *G06T 2210/41* (2013.01)

(58) Field of Classification Search
None
See application file for complete search history.

(56) References Cited

U.S. PATENT DOCUMENTS 6,272,366 B1  8/2001 Vining
7,623,900 B2 * 11/2009 Graham et al. ................ 600/407
2006/0280347 A1  12/2006 Shirahata et al.
2008/0071143 A1 *  3/2008 Gattani et al. ................ 600/117
2011/0018871 A1  1/2011 Shirahata

FOREIGN PATENT DOCUMENTS

| JP | 11283055 A | 10/1999 |
| JP | 2003052057 A | 2/2003 |
| JP | 2005-514086 A | 5/2005 |
| JP | 2005131127 A | 5/2005 |
| WO | 2005011501 A1 | 2/2005 |
| WO | 2009116465 A1 | 9/2009 |

OTHER PUBLICATIONS

Japanese Office Action; Application No. 2010-263258; Apr. 9, 2013.
(Continued)

*Primary Examiner* — Edward Martello
(74) *Attorney, Agent, or Firm* — Sughrue Mion, PLLC

(57) ABSTRACT

An observation path setting unit sets an observation path. A viewpoint setting and changing unit sets a viewpoint on the observation path. When a virtual endoscopic image viewed from the viewpoint is generated, a visual range determination unit identifies, based on a three-dimensional medical image, the position of a wall region of the tubular structure in a local observation direction at the viewpoint that has been set by the viewpoint setting and changing unit and in the vicinity of the local observation direction. The visual range determination unit estimates, based on a positional relationship between the viewpoint and the wall region, a global observation direction at the viewpoint, and determines a visual range of the virtual endoscopic image in such a manner that image information about a region located in the global observation direction with respect to the viewpoint is represented at a central part of the virtual endoscopic image.

7 Claims, 7 Drawing Sheets

(56) References Cited

OTHER PUBLICATIONS

Takahiro Kimura, et al., "A study on automated detection of colonic polyps from 3D abdominal CT images based on shape", Technical Research Report of IEICE, MI, Medical Image, Jan. 18, 2004, pp. 29-34, vol. 103, No. 599, The Instititue of Electronics Information and Communication Engineers.

* cited by examiner

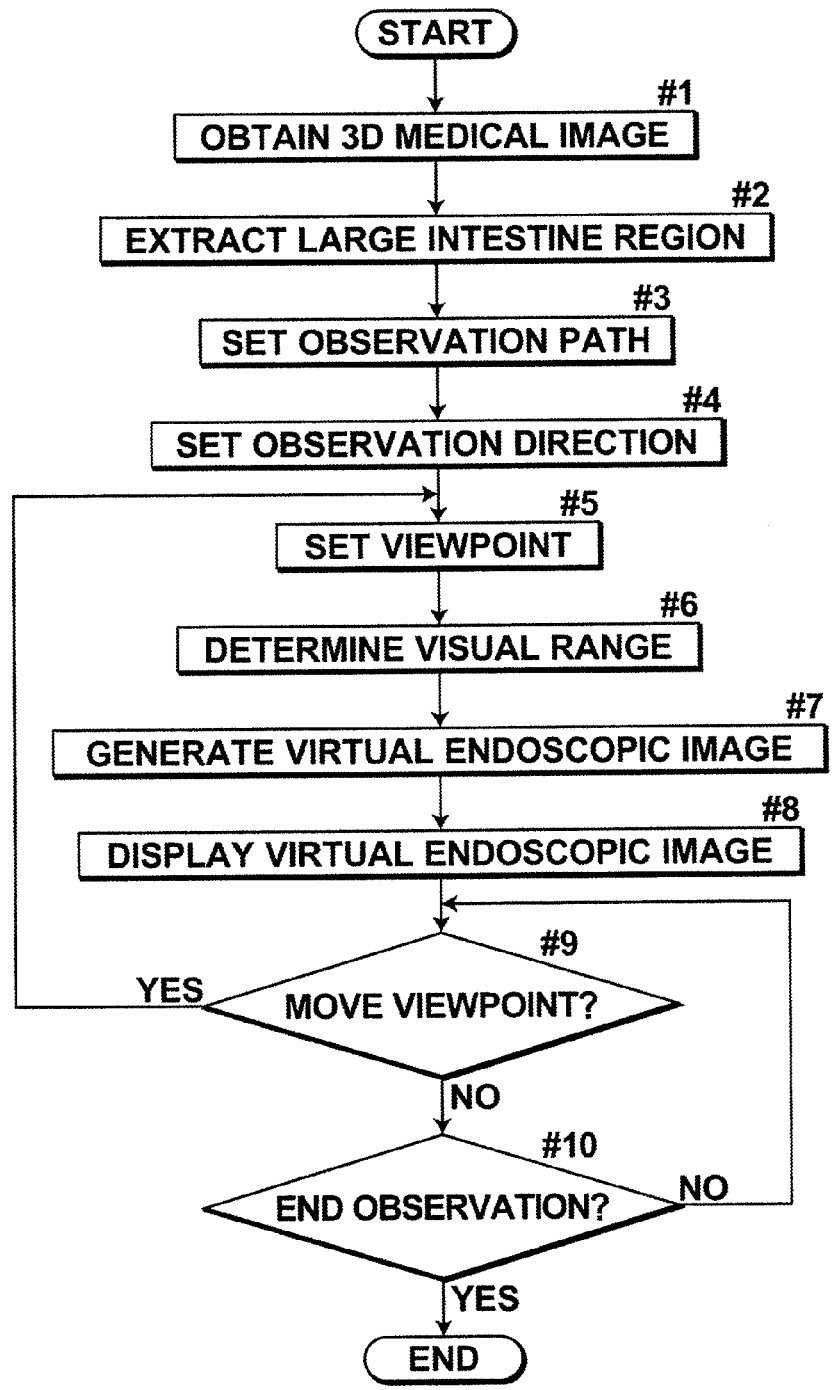

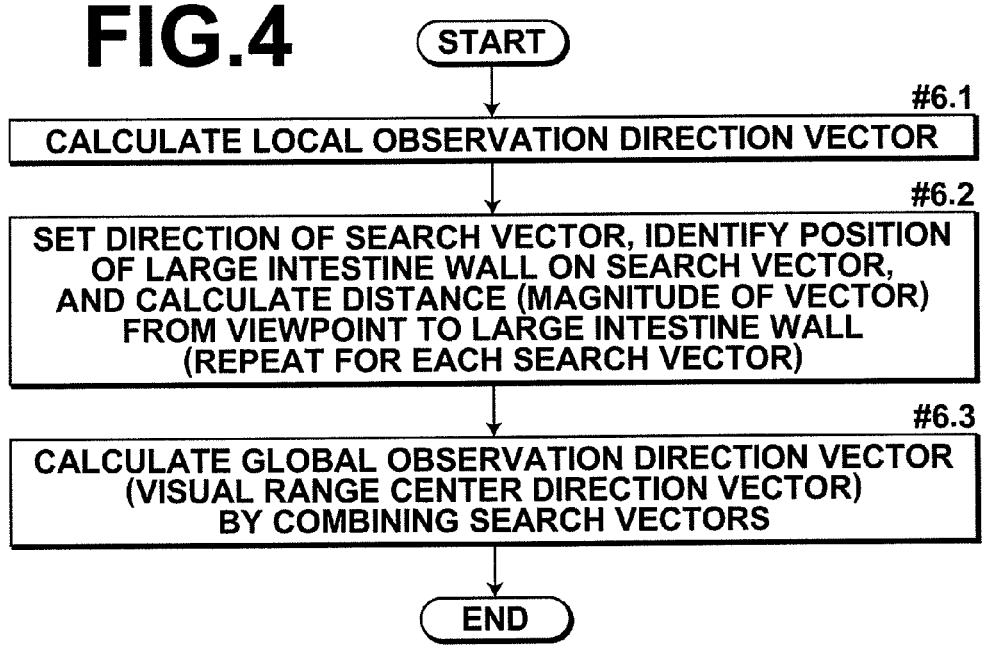
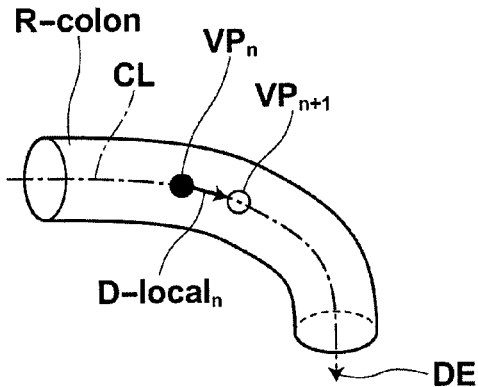
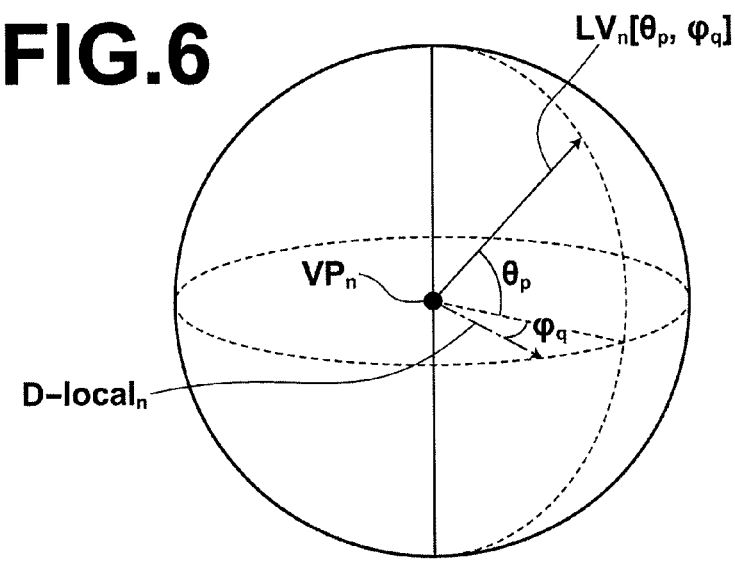

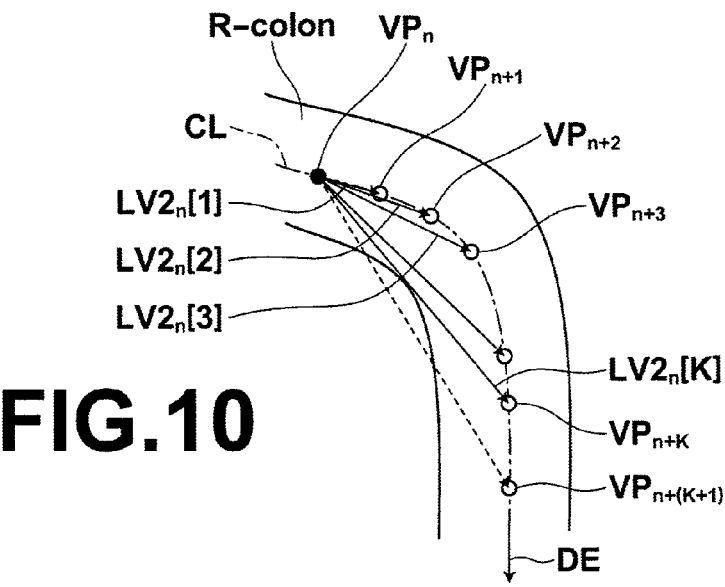
FIG. 10
FIG. 11A
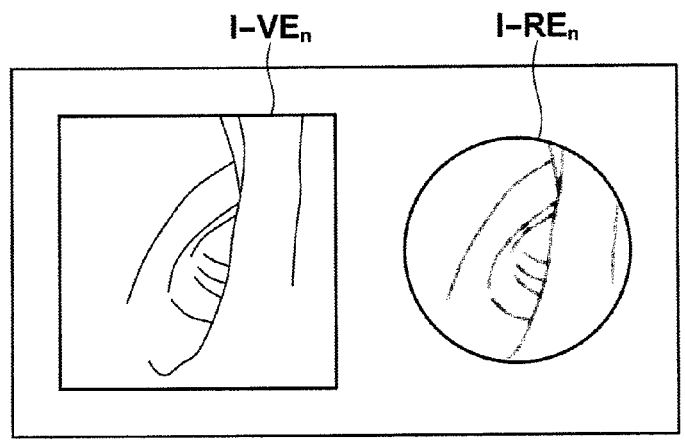
FIG. 11B
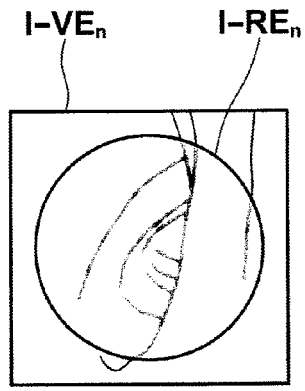

SEQUENTIALLY DISPLAYING VIRTUAL ENDOSCOPIC IMAGES BY SETTING AN OBSERVATION PATH TO COMPENSATE FOR A CURVED REGION OF THE TUBULAR STRUCTURE

BACKGROUND OF THE INVENTION

1. Field of the Invention

The present invention relates to medical image processing techniques for generating a virtual endoscopic image from a three-dimensional medical image representing a tubular structure of a subject to be examined.

2. Description of the Related Art

In recent years, modalities such as MDCT (multidetector computed tomography) advanced, and high-quality three-dimensional (3D) medical images representing a subject to be examined became obtainable. As such 3D medical images are obtainable, medical image processing techniques for generating pseudo-3D images are being developed. An example of such techniques is a virtual endoscopic display method. In the virtual endoscopic display method, an image resembling an endoscopic image, which is obtained by imaging the inside of a tubular organ, is generated from plural two-dimensional tomographic images obtained by CT (computed tomography) (hereinafter, the image resembling a real endoscopic image is referred to as a "virtual endoscopic image"). Examination using virtual endoscopic display is beneficial, because it is less invasive than examination using a real endoscope. Further, examination using virtual endoscopic display can make it possible to observe the condition of the inside of a tubular structure behind an obstruction region, through which a real endoscope is not passable, and the like.

For example, regarding virtual endoscope examination using CT images of large intestines, results of many clinical trials have been reported, and the efficacies of virtual endoscope examination have been confirmed. The results of clinical trials include evaluation of polyp detection rates by virtual endoscopic display, and a comparison between a polyp detection rate by virtual endoscope examination and a polyp detection rate by real endoscope examination. Therefore, virtual endoscope examination on large intestines are expected to be adopted in more cases not only in pre-operation examination but also in screening.

As a technique related to virtual endoscopic display, a technique for sequentially displaying virtual endoscopic images viewed from plural viewpoints set on a center line in the lumen of the colon of a patient is known. In this technique, the center line of the lumen of the colon is set in advance as an observation path, and the virtual endoscopic images are sequentially displayed while a virtual endoscope is moved between the viewpoints at a given speed (for example, please refer to U.S. Pat. No. 6,272,366 (Patent Document 1)).

Meanwhile, instead of setting an observation path of a virtual endoscope in advance, a technique for dynamically setting an observation path of a virtual endoscope is known. Specifically, a weighted average of a direction from a present viewpoint (referred to as point P) to the center of a visual range of a virtual endoscope (the direction is referred to as visual range center direction V) and the direction of a longest ray among plural rays from the present viewpoint P to the wall of the lumen is obtained. The obtained weighted average direction is set as a new visual range center direction (the direction is referred to as visual range center direction V'). Further, a center position of a cross-section of the lumen in the vicinity of a position moved, along the present visual range center direction V, from the present viewpoint P by a predetermined distance is set as new viewpoint P'. At the new viewpoint P', a new visual range center direction is set based on visual range center direction V' at the viewpoint P' and the direction of a longest ray from the viewpoint P' in a similar manner to the aforementioned processing. Further, setting of new viewpoints based on visual range center direction V' is repeated. Accordingly, an observation path is sequentially set (please refer to PCT Japanese Publication No. 2005-514086 (Patent Document 2)).

When the observation path of the virtual endoscope is set in advance as in Patent Document 1, a visual range center direction of the virtual endoscope at each viewpoint generally coincides with a local forward-movement direction of the virtual endoscope at the viewpoint, in other words, coincides with the direction of the center line of the tubular structure in the vicinity of the viewpoint. In such a case, at a curved region of the tubular structure, the visual range center direction differs from a direction in which the center of the tubular structure located further in the forward-movement direction of the virtual endoscope is observable along the center. Specifically, as schematically illustrated in FIG. 12, viewpoint $VP_1$ on center line CL of tubular structure R-colon is located at a position in which the curvature of the tubular structure R-colon is small. Therefore, visual range center direction $DC_1$ at the viewpoint $VP_1$ substantially coincides with the global direction of the center line CL. Further, as illustrated in FIG. 13A, virtual endoscopic image I-$VE_1$' viewed from the viewpoint $VP_1$ is generated in such a manner that the center of the tubular structure R-colon viewed from the viewpoint $VP_1$ coincides with the center (indicated by the mark "+" in FIG. 13A) of image I-$VE_1$'. However, at viewpoint $VP_2$, the curvature of the tubular structure R-colon is large. Therefore, as illustrated in FIG. 13B, visual range center direction $DC_2$ does not coincide with the global direction of the center line CL. Consequently, virtual endoscopic image I-$VE_2$' viewed from the viewpoint $VP_2$ is generated in such a manner that the center of the tubular structure R-colon is shifted from the center (indicated by the mark "+" in FIG. 13B) of image I-$VE_2$' at positions away from the viewpoint $VP_2$ by certain distance.

Meanwhile, in observation of a tubular structure by using a real endoscope, the visual range center direction of the real endoscope substantially coincides with a direction in which the center of the tubular structure located further in the forward-movement direction of the real endoscope is observable along the center. Therefore, a difference in the visual range center directions between the virtual endoscope and the real endoscope gives a sense of incongruity to users. To reduce such a sense of incongruity, the visual range center direction at a curved region may be changed by a manual operation of a mouse or the like by a user (observer). However, such an operation imposes an additional work on the user. Consequently, an observation time becomes long, and the efficiency of diagnosis becomes lower.

SUMMARY OF THE INVENTION

In view of the foregoing circumstances, it is an object of the present invention to provide a medical image processing apparatus, method and program in which a virtual endoscopic image can be generated in such a manner that a central region of a tubular structure appears in a similar manner to a real endoscopic image even at a curved region of the tubular structure.

A medical image processing apparatus according to the present invention is a medical image processing apparatus comprising:

a virtual endoscopic image generation unit configured to generate a virtual endoscopic image of a tubular structure represented in a three-dimensional medical image, and which is viewed from the inside of the tubular structure;

an observation path setting unit configured to set an observation path along the tubular structure in the three-dimensional medical image;

an observation direction setting unit configured to set an observation direction of the tubular structure along the observation path;

a viewpoint setting unit configured to set a viewpoint on the observation path; and a visual range determination unit configured to identify, based on the three-dimensional medical image, the position of a wall region of the tubular structure present in a local observation direction at the viewpoint and in the vicinity of the local observation direction, and to estimate, based on a positional relationship between the viewpoint and the wall region, a global observation direction at the viewpoint, and to determine a visual range of the virtual endoscopic image in such a manner that image information about a region located in the global observation direction with respect to the viewpoint is represented at a central part of the virtual endoscopic image, wherein the virtual endoscopic image generation unit is configured to generate, from the three-dimensional medical image, the virtual endoscopic image representing a view within the visual range at the viewpoint.

Further, a medical image processing method of the present invention is a medical image processing method for generating a virtual endoscopic image of a tubular structure represented in a three-dimensional medical image, and which is viewed from the inside of the tubular structure, the method comprising the steps of:

setting an observation path along the tubular structure in the three-dimensional medical image;

setting an observation direction of the tubular structure along the observation path;

setting a viewpoint on the observation path; and identifying, based on the three-dimensional medical image, the position of a wall region of the tubular structure present in a local observation direction at the viewpoint and in the vicinity of the local observation direction;

estimating, based on a positional relationship between the viewpoint and the wall region, a global observation direction at the viewpoint;

determining a visual range of the virtual endoscopic image in such a manner that image information about a region located in the global observation direction with respect to the viewpoint is represented at a central part of the virtual endoscopic image; and generating, from the three-dimensional medical image, the virtual endoscopic image representing a view within the visual range at the viewpoint.

A medical image processing program of the present invention causes a computer to function as each unit included in the medical image processing apparatus of the present invention.

In the present invention, the observation path may be a center line of the tubular structure.

The observation path may be automatically set by using an image recognition method or the like appropriate for the observation path. Alternatively, the observation path may be set by a manual operation of a user. Further, the automatically set observation path may be corrected by a manual operation. Further, the entire observation path may be automatically set by interpolation calculation or the like based on a partial observation path set based on a manual operation.

The observation direction and the viewpoint may be automatically set based on a predetermined condition. Alternatively, they may be set by a manual operation of the user.

The term "local observation direction" refers to an observation direction in a very small part of the observation path in the vicinity of the viewpoint.

Directions in the vicinity of the local observation direction may be, for example, directions of vectors at less than or equal to 90 degree with respect to a vector representing the local observation direction.

Further, the term "global observation direction" refers to an observation direction when the entire observation path is observed. Specifically, the global observation direction is a direction from the position of a viewpoint toward a position on the observation path located farther than the vicinity of the viewpoint in the observation direction.

In a first example of a method for estimating the global observation direction, the position of the wall region of the tubular structure for each of plural search lines is identified based on pixel values on the plural search lines radially extending, from the viewpoint, in the local observation direction and in the vicinity of the local observation direction. Further, a distance from the viewpoint to the wall region is calculated for each of plural search lines. Further, the global observation direction is estimated by combining the directions of the plural search lines in such a manner that the longer the distance of a search line to the wall region is, the more the direction of the search line contributes to estimation of the global observation direction. In this case, the visual range of the virtual endoscopic image may be narrower than a radiation range of search lines radially extended in the estimation processing. Further, the pixel value of each pixel of the virtual endoscopic image may be determined based on pixel values on the plural search lines that radially extend. Therefore, when a virtual endoscopic image is generated, only the pixel values of pixels in the visual range that has been determined by the aforementioned method should be selected from the pixel values determined for each of the plural search lines.

In a second example of a method for estimating the global observation direction, the vicinity of the local observation direction at the viewpoint may be a direction from the viewpoint toward each of plural search points on the observation path located on the forward side of the viewpoint along the set observation direction. Further, the direction of one of second search lines on which the wall region is not present between the viewpoint and the search points, and the length of which is sufficiently long to satisfy a predetermined standard, may be determined, based on pixel values on plural second search lines connecting the viewpoint and the plural search points, as the global observation direction.

In the present invention, a region of interest having a predetermined image characteristic in the tubular structure may be extracted. The visual range may be determined further based on the region of interest.

In the present invention, a real endoscopic image may be obtained at a second viewpoint on a second observation path corresponding to the observation path, and the second viewpoint corresponding to the viewpoint, by imaging the inside of the tubular structure in a second visual range corresponding to the visual range by using an endoscope. Further, the virtual endoscopic image and the real endoscopic image may be displayed on a display unit at the same time.

According to the present invention, when a virtual endoscopic image viewed from a viewpoint on a given observation path is generated, the position of a wall region of the tubular structure present in a local observation direction at the viewpoint and in the vicinity of the local observation direction is identified based on the three-dimensional medical image. Further, a global observation direction at the viewpoint is estimated based on a positional relationship between the viewpoint and the wall region. Further, a visual range of the virtual endoscopic image is determined in such a manner that image information about a region located in the global observation direction with respect to the viewpoint is represented at a central part of the virtual endoscopic image. Therefore, the central region of the tubular structure is displayed at a central part of the virtual endoscopic image not only for positions in the vicinity of the viewpoint but also for positions away from the viewpoint. Accordingly, it is possible to generate a virtual endoscopic image in which the central region of the tubular structure appears in a manner similar to a real endoscopic image even at a curved region of the tubular structure. Therefore, it is possible to reduce a sense of incongruity felt by a user (observer) with respect to the visual range of the virtual endoscopic image. Further, it is possible to reduce the work and operation for changing the visual range. Further, it is possible to reduce a time period for observation, and to improve the efficiency of diagnosis.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 3 is a flow chart illustrating a flow of large intestine virtual endoscope examination using a medical image diagnosis system according to an embodiment of the present invention;

FIG. 4 is a flow chart illustrating a flow of processing for determining a visual range of a virtual endoscope according to an embodiment of the present invention;

FIG. 5 is a diagram schematically illustrating a local observation direction vector;

FIG. 6 is a diagram schematically illustrating a method for regulating the direction of a search vector;

FIG. 10 is a diagram schematically illustrating a method for determining a global observation direction vector in a modified example of an embodiment of the present invention;

FIG. 11A is a diagram schematically illustrating a first example of a display of a virtual endoscopic image and a real endoscopic image in a modified example of an embodiment of the present invention;

FIG. 11B is a diagram schematically illustrating a second example of a display of a virtual endoscopic image and a real endoscopic image in a modified example of an embodiment of the present invention;

DESCRIPTION OF THE PREFERRED EMBODIMENTS

Hereinafter, a medical image diagnosis system into which a medical image processing apparatus according to an embodiment of the present invention has been introduced will be described by using, as an example, large intestine analysis processing for a virtual endoscope examination. In the virtual endoscope examination, while a viewpoint is moved along an observation path (center line) in the large intestine, virtual endoscopic images at the viewpoints are sequentially observed based on a three-dimensional medical image of the abdomen of a patient obtained by multi-slice CT.

Figure 1:
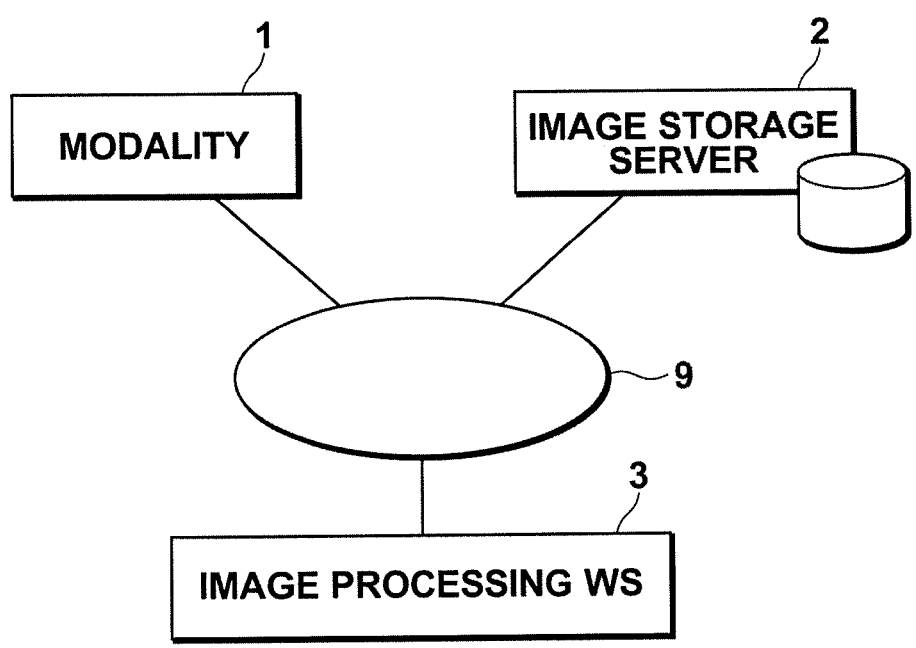
FIG. 1 is a schematic diagram illustrating the configuration of a medical image diagnosis system in which a medical image processing apparatus according to an embodiment of the present invention has been introduced.

FIG. 1 is a schematic diagram illustrating the hardware configuration of the medical image diagnosis system. As illustrated in FIG. 1, the system includes a modality 1, an image storage server 2, and an image processing workstation 3, which are connected to each other through a network 9 in such a manner that they can communicate with each other.

The modality 1 performs radiography on the abdomen (large intestine region) of a subject to be examined (patient), and generates image data representing a three-dimensional medical image of the region. Further, supplementary information (tag information) regulated by DICOM (Digital Imaging and Communications in Medicine) standard is attached to the image data, and output as image information. In the present embodiment, the modality 1 includes a multi-slice CT.

The image storage server 2 is a computer that stores medical image data obtained by the modality 1 and image data about a medical image generated by image processing by the image processing workstation 3 in an image database, and that manages the data. The image storage server 2 includes a large-capacity external storage apparatus, and software for database management (for example, ORDB (Object Relational Database) management software).

The image processing workstation 3 functions as a medical image diagnosis support apparatus of the present invention. The image processing workstation 3 is a computer that performs, based on a request from a doctor (user) who reads radiographic images, image processing (including image analysis) on medical image data obtained from the modality 1 and the image storage server 2. Further, the image processing workstation 3 displays a generated image. The image processing workstation 3 has known hardware configuration including a CPU, a main storage device, an auxiliary storage device, an input/output (I/O) interface, a communication interface, an input device (a mouse, a keyboard, or the like), a display device (a display monitor or the like), a data bus, and the like. A known operating system or the like has been installed in the computer. Medical image processing (large intestine analysis processing) of the present invention is performed by causing the computer to execute a program (large intestine analysis application) installed from a recording medium, such as a CD-ROM. The program may be downloaded from a storage device in a server connected to the computer through a network, such as the Internet, and installed in the computer.

The storage format of image data and communication between the apparatuses and the devices through the network 9 are based on a protocol, such as DICOM.

Figure 2:
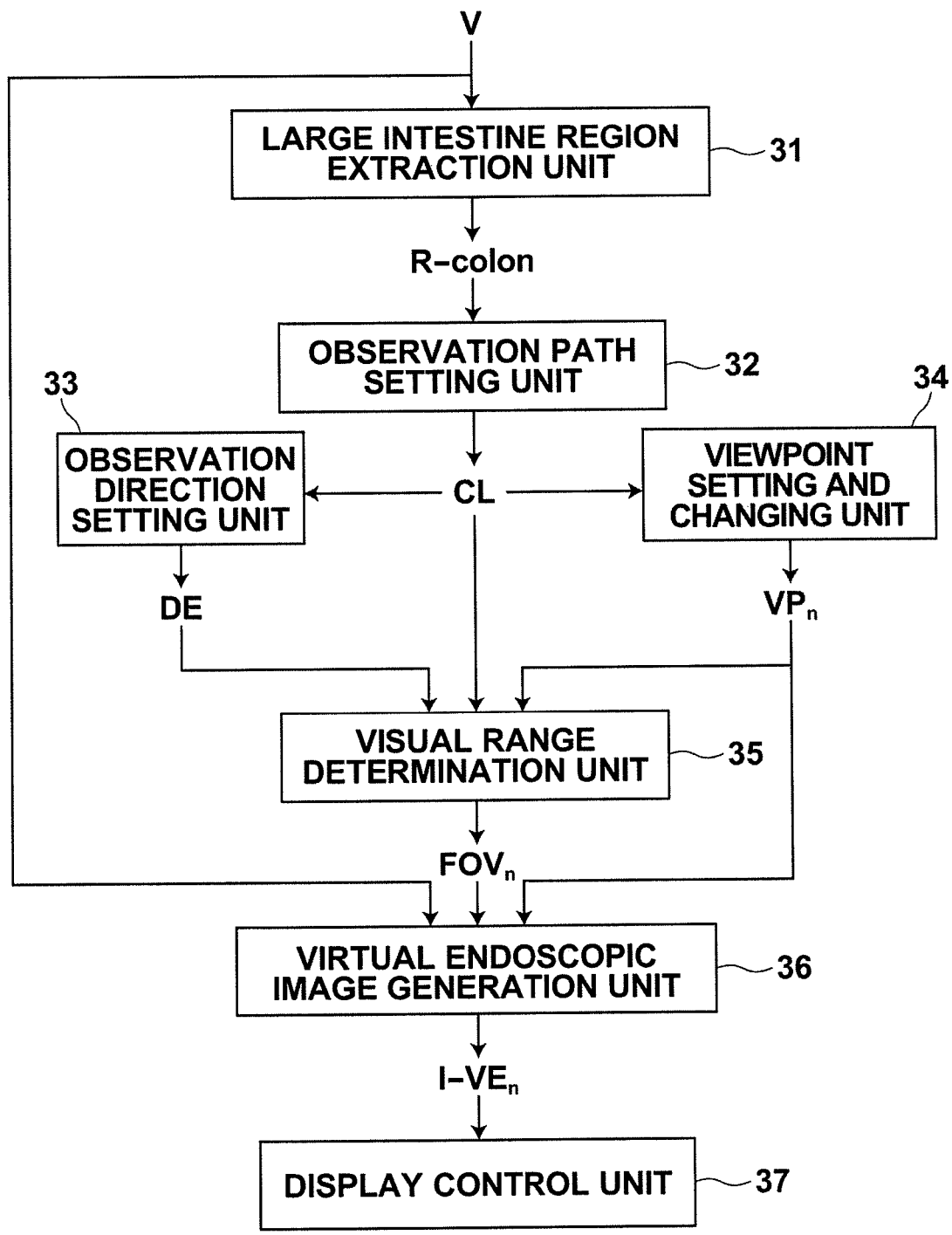
FIG. 2 is a block diagram schematically illustrating configuration and a flow of processing for realizing a medical image processing function (large intestine virtual endoscope examination function) in an embodiment of the present invention.

FIG. 2 is a block diagram illustrating a part of the functions of the image processing workstation 3 related to large intestine analysis processing in an embodiment of the present invention. As illustrated in FIG. 2, the large intestine analysis processing in the present embodiment is realized by a large intestine region extraction unit 31, an observation path setting unit 32, an observation direction setting unit 33, a viewpoint setting and changing unit 34, a visual range determination unit 35, a virtual endoscopic image generation unit 36, and a display control unit 37. Further, each of image data V about a CT image of the abdomen, large intestine region information R-colon (information about large intestine region), observation path information CL, observation direction information DE, viewpoint information $VP_n$ (n=1, 2, ..., N) of a virtual endoscope, visual range information $FOV_n$ of a virtual endoscope, and virtual endoscopic images $I\text{-}VE_n$ is read from or stored in a predetermined storage area of the image processing workstation 3 by the aforementioned processing units.

Next, with reference to the flow chart illustrated in FIG. 3, a flow of large intestine analysis processing in the embodiment of the present invention will be described. Further, the content of processing performed by each processing unit will be described in detail.

First, a user (for example, a doctor who reads radiographic images, such as a radiologist) selects, from an examination list or a series list displayed on a display of the image processing workstation 3, CT image data V obtained by multi-slice CT. The CT image data V represent a target image of large intestine analysis. Then, the image processing workstation 3 obtains the selected CT image data V (step #1). When the user performs an operation for starting large intestine analysis application, image analysis on the selected CT image data V is started.

The large intestine region extraction unit 31 receives the CT image data V, and automatically extracts large intestine region R-colon, which is a target of observation, by using a known method (step #2). Specifically, binary processing is performed on each of axial section images representing cross sections (axial sections) perpendicular to the body axis of a patient. The axial section images constitute the CT image data V, or are reconstructed from the CT image data V. Further, the outline of the surface of a human body is extracted by outline extraction processing, and the inside of the outline (a region defined by the outline) is extracted as a body (human body) region. Then, binary processing is performed on the body region by using a threshold value, and a candidate of the large intestine region is extracted from each of the axial section images. Since the lumen of the large intestine is filled with air during radiography of multi-slice CT, a difference in CT values between the inside of the large intestine and surrounding tissues is noticeably large. Therefore, this characteristic is used, and binary processing is performed by setting a threshold value corresponding to the CT value of air. Accordingly, an air region in the human body is extracted from each of the axial section images. Finally, only a region in which the extracted air regions in the human body are connected to each other between axial cross section images is extracted as the large intestine region. Information R-colon representing the extracted large intestine region is stored, as mask data, in a predetermined storage area in the image processing workstation 3. In the mask data, a flag for identifying whether each of points in a three-dimensional coordinate system of CT image data V belongs to a large intestine region is correlated with respective points in the three-dimensional coordinate system.

The observation path setting unit 32 sets observation path CL along large intestine region R-colon extracted by the large intestine region extraction unit 31 (step #3). Specifically, the core line (center line) of the large intestine may be extracted by using a known method, and the extracted core line may be used as the observation path CL. The core line of the large intestine may be extracted by performing three-dimensional thinning on a binary image representing the large intestine region that has been obtained, by the large intestine region extraction unit 31, by extracting only a region in which air regions in the human body are connected to each other in extraction of the large intestine (please refer to Japanese Unexamined Patent Publication No. 2004-283373, or the like). Further, the observation path CL is obtained by selecting a path having a longest length from the thinning result of the large intestine region. Here, a user interface may be further provided to manually correct the extraction result of the large intestine and the core line. Specifically, the user interface may display an extracted large intestine region and core line with emphasis in each of the axial section images. Further, the user may correct the large intestine region and the core line (in the image, the core lines appears as a point) in each of the axial section images by an operation using a mouse or the like, when the extraction result of the large intestine region or the core line is wrong. Alternatively, the observation path setting unit 32 may make the display device of the image processing workstation 3 display large intestine region R-colon, and a user interface for receiving selection of a start point and a last point of an observation path may be provided. Then, a shortest path connecting the selected start point and the selected last point in the large intestine region R-colon may be calculated by using a known shortest path search algorithm, and the calculated shortest path may be used as observation path CL. For example, information CL representing the set observation path is stored, as data representing a string of points in a three-dimensional coordinate system of CT image data V, in a predetermined storage area in the image processing workstation 3.

The observation direction setting unit 33 sets observation direction DE of the large intestine along the observation path CL (step #4). The viewpoint setting and changing unit 34 sets first viewpoint $VP_1$ of virtual endoscope observation on the observation path CL (step #5). Specifically, a user interface may be provided to display the large intestine region R-colon and the observation path CL at a display device in the image processing workstation 3, and to receive selection of a start point and a last point of observation path CL, and first viewpoint $VP_1$. Accordingly, the observation direction DE from the selected start point toward the selected last point in the observation path CL is set. When a user interface similar to the aforementioned user interface is used to set the observation path CL, as described above, the observation direction DE should be set by using the start point and the last point that have been set by the observation path setting unit 32. Alternatively, judgment may be made, based on the coordinate values of both of endpoints of the observation path CL, as to whether each of the end points is a head-side (small intestine side) end point or a leg-side (anus side) end point. Further, an end point on a predetermined side (for example, a leg-side end point) may be set as a start point, and the other end point may be set as a last point to automatically set the observation direction DE. Further, the first viewpoint $VP_1$ may be set automatically. For example, the start point of the observation path CL, or a point away from a predetermined point, such as an end point of the observation path CL, by a predetermined distance along the observation path CL, or the like may be set as the first viewpoint $VP_1$.

The visual range determination unit 35 identifies, based on CT image data V, the position of a wall region of the large intestine R-colon present in local observation direction D-local$_1$ at viewpoint $VP_1$ set by the viewpoint setting and changing unit 34 and in the vicinity of the local observation direction $LV_1[\theta_p, \phi_q]$ (p=1, 2, ..., P, q=1, 2, ..., Q). Further, the visual range determination unit 35 estimates, based on a positional relationship between the viewpoint $VP_1$ and the wall region, global observation direction D-global$_1$ at the viewpoint $VP_1$. Further, the visual range determination unit 35 determines visual range $FOV_1$ of virtual endoscopic image I-VE$_1$ in such a manner that image information about a region located in the global observation direction D-global$_1$ with respect to the viewpoint $VP_1$ is displayed at a central part of the virtual endoscopic image I-VE$_1$ (step #6).

FIG. 4 is a flow chart illustrating a flow of visual range determination processing by the visual range determination unit 35 in the embodiment of the present invention in detail. As illustrated in FIG. 4, first, the visual range determination unit 35 calculates local observation direction vector D-local$_1$ (step #6.1). Specifically, as schematically illustrated in FIG. 5 (here, n=1), a vector from viewpoint $VP_1$ on observation path CL along large intestine region R-colon, as a start point, to next viewpoint $VP_2$ along observation direction DE, as a last point, is calculated as local observation direction vector D-local$_1$. This local observation direction vector D-local$_1$ represents a local observation direction at the viewpoint $VP_1$. Here, a distance along the observation path CL from the current viewpoint $VP_1$ to next viewpoint $VP_2$ is provided, as a processing parameter of large intestine analysis application of the present embodiment, by a initial setting file or by a user input. Alternatively, the local observation direction vector D-local$_n$ may be a vector from the current viewpoint $VP_n$, as a start point, and the direction of the local observation direction vector D-local$_n$ may be a direction from previous viewpoint $VP_{n-1}$ before the current viewpoint $VP_n$ to viewpoint $VP_{n+1}$ after the current viewpoint $VP_n$.

Next, the visual range determination unit 35 sets the directions of search vectors $LV_1[\theta_p, \phi_q]$ (p=1, 2, ..., P, q=1, 2, ..., Q) in the direction of the local observation direction vector D-local$_1$ and in the vicinity of the local observation direction. Further, the visual range determination unit 35 identifies the position of the wall of the large intestine in the direction of each of the search vectors $LV_1[\theta_p, \phi_q]$. Further, with respect to each direction, the visual range determination unit 35 calculates, as the magnitude of search vector $LV_1[\theta_p, \phi_q]$, a distance from viewpoint $VP_1$ to the wall of the large intestine (step #6.2).

Figure 7:
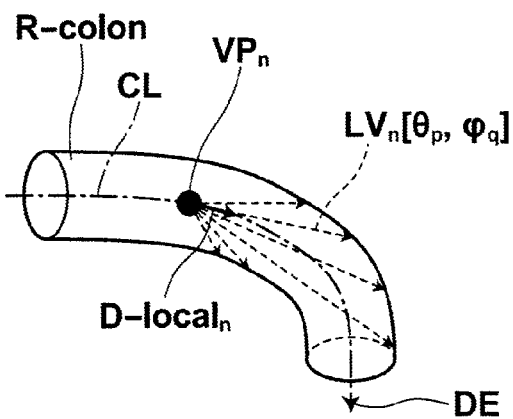
FIG. 7 is a schematic diagram illustrating search vectors in a large intestine region.

FIG. 6 is a schematic diagram illustrating a method for regulating the direction of search vector $LV_1[\theta_p, \phi_q]$ in the present embodiment. As illustrated in FIG. 6, first, the visual range determination unit 35 sets a latitude direction and a longitude direction with respect to local observation direction vector D-local$_1$. Latitude $\theta_p$ is within the range of $\theta_1 \leq \theta_p \leq \theta_P$, and longitude $\phi_q$ is within the range of $\phi_1 \leq \phi_q \leq \phi_Q$, and the directions of P×Q of search vectors $LV_1[\theta_p, \phi_q]$ are set (P×Q is the number of vectors). Here, as schematically illustrated in FIG. 7, the latitude and the longitude of the local observation direction vector D-local$_1$ are 0 degrees, and $\theta_1$, $\theta_P$, $\phi_1$, $\phi_Q$ are set at predetermined values satisfying −90 degrees≤$\theta_1$<0 degree, 0 degree<$\theta_P$≤90 degree, −90 degree≤$\phi_1$<0 degree, and 0 degree<$\phi_Q$≤90 degree, respectively. Further, the directions of the search vectors $LV_1[\theta_p, \phi_q]$ radially extending from the viewpoint $VP_1$ may be set with the direction of the local observation direction vector D-local$_1$ as the center of the radial directions. Further, the condition of P=Q may be satisfied to give isotropy in the latitude direction and in the longitude direction.

Next, the visual range determination unit 35 performs known ray-casting with respect to the direction of each set search vector $LV_1[\theta_p, \phi_q]$ to identify the position of the wall of the large intestine in the direction of respective search vectors $LV_1[\theta_p, \phi_q]$. Specifically, for example, the opacity of a CT value corresponding to the wall of the large intestine is set at 1.0, and the opacity of a CT value corresponding to air in the large intestine is set at 0.0 so that a ray casted from the position of the viewpoint in the direction of each search vector $LV_1[\theta_p, \phi_q]$ stops at the wall of the large intestine. Further, the position at which the ray stopped may be identified as the position of the wall of the large intestine. Further, with respect to the direction of each search vector $LV_1[\theta_p, \phi_q]$, a distance from the viewpoint $VP_1$ to the wall of the large intestine is calculated as the magnitude of the search vector $LV_1[\theta_p, \phi_q]$.

This processing is sequentially repeated with respect to the direction of each of the set search vectors $LV_1[\theta_p, \phi_q]$. Accordingly, the direction and the magnitude of each search vector $LV_1[\theta_p, \phi_q]$ from the position of the viewpoint $VP_1$, as a start point, to the position of the wall of the large intestine, as a last point, are set.

Figure 8:
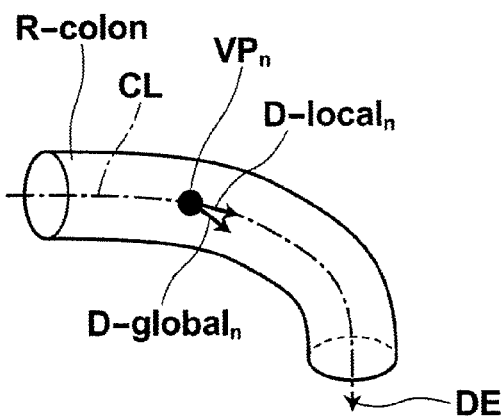
FIG. 8 is a diagram schematically illustrating a difference between the direction of a local observation direction vector and the direction of a global observation direction vector (visual range center direction vector)

Further, the visual range determination unit 35 combines the search vectors $LV_1[\theta_p, \phi_q]$ to calculate the global observation direction vector D-global$_1$ (step #6.3). Consequently, as schematically illustrated in FIG. 8, the direction of the global observation direction vector D-global$_1$ inclines from the local observation direction D-local$_1$ toward a direction in which many long search vectors $LV_1[\theta_p, \phi_q]$, which have large magnitudes, are distributed. Specifically, the direction of the global observation direction vector D-global$_1$ represents a global observation direction from viewpoint $VP_1$ to positions away from the viewpoint $VP_1$ toward the last point of observation direction DE. In other words, the direction of the global observation direction vector D-global$_1$ represents a direction in the vicinity of a farthest viewable position in the large intestine along the observation path CL, which is viewable from the viewpoint $VP_1$. In FIG. 8, a unit vector of the global observation direction vector D-global$_1$ is illustrated. After search vectors $LV_1[\theta_p, \phi_q]$ are combined, the combined vector is divided by the norm of the vector to obtain the unit vector. In later operations, a unit vector may be also used as the global observation direction vector D-global$_1$.

Finally, the visual range determination unit 35 sets visual range $FOV_1$ having a predetermined angle of visual field (angle of view) with the global observation direction vector D-global$_1$ as the center of the visual range.

In the aforementioned processing, the ranges of the values of latitude $\theta_p$ and longitude $\phi_q$ and the predetermined angle of visual field are provided, as a processing parameter of large intestine analysis application of the present embodiment, by a initial setting file or by a user input. Alternatively, the ranges of latitude $\theta_p$ and longitude $\phi_q$ may be variables corresponding to the position of the viewpoint $VP_n$, and which are calculated based on the curvature of the observation path CL or the like. Specifically, in a region in which the observation path CL is a substantially straight line, a difference between the local observation direction and the global observation direction is small. However, in a region in which the observation path CL is greatly curved, a difference between the local observation direction and the global observation direction is large. Therefore, it is desirable that the ranges of latitude $\theta_p$ and longitude $\phi_q$ are smaller as the curvature of the observation path CL is smaller, and that the ranges of latitude $\theta_p$ and longitude $\phi_q$ are larger as the curvature of the observation path CL is larger.

Figure 9:
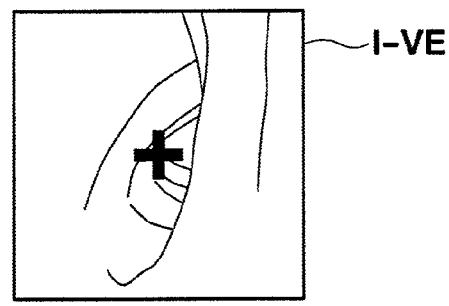
FIG. 9 is a diagram schematically illustrating a virtual endoscopic image generated in an embodiment of the present invention.
Figure 12:
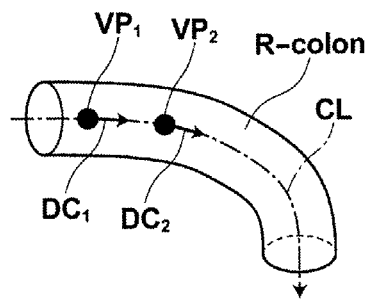
FIG. 12 is a diagram schematically illustrating a visual range center vector of a virtual endoscopic image generated by using a conventional technique.
Figure 13A:
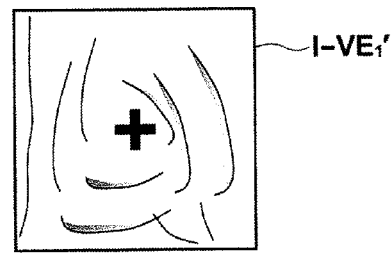
FIG. 13A is a diagram schematically illustrating a virtual endoscopic image generated at a viewpoint in a substantially straight region of a tubular structure by using a conventional technique.
Figure 13B:
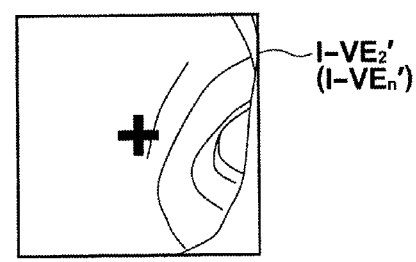
FIG. 13B is a diagram schematically illustrating a virtual endoscopic image generated at a viewpoint in a curved region of a tubular structure by using a conventional technique.

The virtual endoscopic image generation unit 36 receives CT image data V, and generates virtual endoscopic image $I\text{-}VE_1$ representing a region in visual range $FOV_1$ viewed from viewpoint $VP_1$ by a volume rendering method using known ray-casting (step #7). Specifically, projection image $I\text{-}VE_1$ is generated from the CT image data V by central projection. Image information about an image on plural search lines radially extending in the range of the visual range $FOV_1$ that has been determined by the visual range determination unit 35 from the viewpoint $VP_1$ that has been set by the viewpoint setting and changing unit 34 is projected onto a projection plane perpendicular to the global observation direction $D\text{-}global_1$. In this manner, the projection image $I\text{-}VE_1$ is generated. The generated projection image $I\text{-}VE_1$ is a virtual endoscopic image as if the inside of the large intestine is observed by using a real endoscope. FIG. 9 is a schematic diagram illustrating an example of generated virtual endoscopic image $I\text{-}VE_1$ (in FIG. 9, n=1). As illustrated in FIG. 9, in the present embodiment, the center (indicated by the mark "+") of the visual range of the virtual endoscopic image $I\text{-}VE_1$ coincides with the direction of the global observation vector $D\text{-}global_1$. Therefore, the center of large intestine R-colon is represented in the vicinity of the central part of the virtual endoscopic image $I\text{-}VE_1$. In contrast, when the center (indicated by the mark "+") of the visual range of the virtual endoscopic image coincides with the direction of local observation vector $D\text{-}local_1$ (please refer to FIG. 13B), the center of the large intestine R-colon is shifted from the center of the virtual endoscopic image $I\text{-}VE_1'$.

The display control unit 37 makes the image processing work station 3 display the generated virtual endoscopic image $I\text{-}VE_1$ (step #8).

Here, the execution state of the large intestine analysis application is a state of waiting for various operations by a user. In the present embodiment, the state waits for detection of a viewpoint moving operation (step #9) and an observation ending operation (step #10). In FIG. 3, the wait state is represented by a loop formed by NO in step #9 and NO in step #10. Alternatively, the wait state may be a state of waiting for detection of an operation for displaying an image other than a virtual endoscopic image $I\text{-}VE_1$, such as a developed view of the large intestine cut along the direction of center line CL, or a two-dimensional section image at a cross section perpendicular to the center line CL.

When the viewpoint setting and changing unit 34 receives an operation for moving viewpoint $VP_1$ (step #9; YES), the viewpoint setting and changing unit 34 changes the position of the viewpoint $VP_1$ to the position of new viewpoint $VP_2$ based on the received operation (step #5). The operation for moving the viewpoint $VP_1$ may be performed by operating a wheel of a mouse at the image processing workstation 3, by pressing up/down arrow key of a keyboard, or the like. Here, for example, when the wheel operation is an operation in a forward direction or an up arrow key is pressed, the direction of movement of the viewpoint $VP_1$ may be the same as observation direction DE (forward). When the wheel operation is an operation in a backward direction or a down arrow key is pressed, the direction of movement of the viewpoint $VP_1$ may be opposite to observation direction DE (backward). Even when the viewpoint $VP_1$ is moved in the backward direction, the direction of observation direction DE itself does not change. Further, a movement amount from viewpoint $VP_1$ to viewpoint $VP_2$ may be determined based on the amount of operation of the wheel, the length of time of pressing the key, or the like. Further, at this time, if an operation for moving the viewpoint $VP_1$ in the observation direction DE, especially in a forward direction, is detected although the position of the current viewpoint $VP_1$ is the last point of observation path CL, the viewpoint setting and changing unit 34 does not change the viewpoint $VP_1$. In this case, the display control unit 37 may display an alert message to inform the user that it is impossible to move the viewpoint $VP_1$ further in that direction.

After new viewpoint $VP_2$ is set, visual range $FOV_2$ at the new viewpoint $VP_2$ is determined in a manner similar to the aforementioned processing (step #6), and virtual endoscopic image $I\text{-}VE_2$ is generated (step #7). The generated image is displayed (step #8). In this manner, the large intestine analysis application causes the computer to repeat, based on the operation for moving the viewpoint $VP_n$, regeneration of virtual endoscopic image $I\text{-}VE_n$ at the new viewpoint $VP_n$ with visual range $FOV_n$, and update of the display. Meanwhile, when an operation for moving the viewpoint $VP_n$ is not received (step #9; NO), but an operation for ending observation is received (step #10; YES), the large intestine analysis application ends.

As described above, in the embodiment of the present invention, when virtual endoscopic image $I\text{-}VE_n$ viewed from viewpoint $VP_n$ on observation path CL is generated, the visual range determination unit 34 identifies, based on CT image data V, the position of a wall region of the large intestine present in plural search vectors $LV_1[\theta_n, \phi_q]$ representing local observation direction vector $D\text{-}local_n$ at the viewpoint and in the vicinity of the local observation direction vector $D\text{-}local_n$, and estimates, based on a positional relationship between the viewpoint $VP_n$ and the wall region, a global observation direction vector $D\text{-}global_n$ at the viewpoint $VP_n$, and determines visual range $FOV_n$ of the virtual endoscopic image $I\text{-}VE_n$ in such a manner that image information about a region located in the direction of the global observation direction vector $D\text{-}global_n$ with respect to the viewpoint $VP_n$ is represented at a central part of the virtual endoscopic image $I\text{-}VE_n$. Therefore, a central region of the large intestine including not only positions in the vicinity of the viewpoint $VP_n$ but also positions away from the viewpoint $VP_n$ is represented at a central part of the virtual endoscopic image $I\text{-}VE_n$. Accordingly, it is possible to generate virtual endoscopic image $I\text{-}VE_n$ in which central region CL of the large intestine appears in a similar manner to a real endoscopic image also in a curved region of the large intestine. Therefore, it is possible to reduce the sense of incongruity with respect to the visual range $FOV_n$ of the virtual endoscopic image $I\text{-}VE_n$ by the user. Further, it is possible to reduce the work and operation for changing the visual range $FOV_n$ by the user. Further, it is possible to reduce a time period for observation, and to improve the efficiency of diagnosis.

Next, a modified example of the aforementioned embodiment will be described.

In the aforementioned embodiment, when the visual range determination unit 34 calculates global observation direction vector $D\text{-}global_n$, the visual range determination unit 34 may determine a search vector $LV_n[\theta_p, \phi_q]$ having the longest length among the search vectors $LV_n[\theta_p, \phi_q]$, as the global observation direction vector D-global$_n$, instead of calculating the sum of the search vectors $LV_n[\theta_p, \phi_q]$. Alternatively, a search vector $LV_n[\theta_p, \phi_q]$ having the longest length among the search vectors $LV_n[\theta_p, \phi_q]$ and the local observation direction vector D-local$_n$ may be simply combined, or weighted and combined to determine the global observation direction vector D-global$_n$. However, in this case, a specific structure locally present on the wall of the large intestine may cause a noise with respect to the schematic structure of the position of the wall of the large intestine. More specifically, when search vector $LV_n[\theta_p, \phi_q]$ pointing to a diverticulum region in the large intestine is present, the magnitude of the vector is extremely large. Therefore, if this vector is judged as a search vector $LV_n[\theta_p, \phi_q]$ having the longest length among the search vectors $LV_n[\theta_p, \phi_q]$, there is a risk that visual range $FOV_n$ of the virtual endoscopic image I-VE$_n$ is not set at a position appropriate for the schematic structure of the wall of the large intestine by using the aforementioned modified example of the method for determining global observation direction vector D-global$_n$. Further, when extraction of the large intestine region (the wall of the large intestine) is inappropriate, or when definition of opacity for ray-casting of search vector $LV_n[\theta_p, \phi_q]$ is inappropriate, similar problems may arise. However, when the sum of the search vector $LV_n[\theta_q, \phi_q]$ is obtained as in the aforementioned embodiment of the present invention, the influence of the local noise as described above is small. Therefore, it is possible to determine a direction appropriate for the schematic structure of the position of the wall of the large intestine, as the global observation direction vector D-global$_n$.

Further, in the aforementioned embodiment, ray-casting is separately performed by the visual range determination unit 35 and by the virtual endoscopic image generation unit 36. Instead, the process of identifying the position of the wall of the large intestine by the visual range determination unit 35 and the process of determining the pixel value of each pixel of the virtual endoscopic image I-VE$_n$ by the virtual endoscopic image generation unit 36 may be performed by performing ray-casting only once. In this case, the range of search vectors $LV_n[\theta_p, \phi_q]$ should be set wider than the angle of view of the virtual endoscopic image, and the virtual endoscopic image generation unit 36 should generate the virtual endoscopic image I-VE$_n$ by selecting pixel values determined on search vectors $LV_n[\theta_p, \phi_q]$ in the visual range $FOV_n$ determined by the visual range determination unit 35. Ray-casting tends to impose a heavy processing load. Therefore, if the same ray-casting operation is used for both purposes, the processing efficiency is improved.

Further, in the aforementioned embodiment, when the visual range determination unit 34 calculates the sum of search vectors $LV_n[\theta_p, \phi_q]$ to obtain global observation direction vector D-global$_n$, weighting may be further performed by using an amount of movement from the previous viewpoint $VP_{n-1}$, a movement speed of the viewpoint $VP_n$, or the like.

Further, the visual range determination unit 35 may determine the global observation direction vector D-global$_n$ by using a method different from the aforementioned method. For example, as schematically illustrated in FIG. 10, the visual range determination unit 35 sets search vectors $LV2_n[1], LV2_n[2] \ldots, LV2_n[k]$ that point from the current viewpoint $VP_n$ to respective search points (here, viewpoints $VP_{n+1}, VP_{n+2} \ldots$, following the current viewpoint $VP_n$) on observation path CL in observation direction. Further, ray-casting similar to the aforementioned embodiment is performed on the search vectors sequentially from search vector $LV2_n[1]$, which points to a search point closest to the current viewpoint $VP_n$, to judge whether a wall region of the large intestine is present on respective search vectors. Further, a longest search vector among search vectors that have been judged as search vectors in which the wall region is not present is identified, and the identified search vector (in FIG. 10, search vector $LV2_n[K]$) is determined as global observation direction vector D-global$_n$. In FIG. 10, the search vector $LV2_n[K]$ is the first vector that touches the wall region of the large intestine. Therefore, the visual range determination unit 36 stops the aforementioned judgment after judgment on the search vector $LV2_n[K]$, and does not set the next search vector $LV2_n[K+1]$. Consequently, it is possible to reduce the number of rays in ray-casting for determining the global observation direction vector D-global$_n$. Therefore, it is possible to reduce a processing load. Further, the direction of the global observation direction vector D-global$_n$ is always a direction from the current viewpoint $VP_n$ to a point on the observation path (core line of the large intestine) CL. Therefore, it is possible to certainly capture the center of the tubular structure located at a far position. When the length of a search vector on which the wall of the large intestine is not present is longer than a predetermined threshold value, this search vector may be determined as the global observation direction vector D-global$_n$. Accordingly, it is possible to determine the global observation direction vector D-global$_n$ quickly also in a straight region of the large intestine.

In the aforementioned embodiment and the modified example, the viewpoint setting and changing unit 34 changes the position of the viewpoint $VP_n$ to $VP_{n+1}$ based on an operation by the user. Alternatively, for example, the position of the viewpoint may be automatically changed at predetermined time intervals, and at predetermined intervals of distance. Accordingly, it is possible to dynamically display the virtual endoscopic image I-VE$_n$ as if an endoscope automatically moves in the large intestine.

In the aforementioned embodiment and the modified example, a lesion detection unit for automatically detecting a lesion region, such as a polyp in the large intestine, by receiving CT image data V may be provided. In this case, when a detected lesion region is present in visual range $FOV_n$ in virtual endoscopic image I-VE$_n$, the virtual endoscopic image generation unit 36 may generate the virtual endoscopic image I-VE$_n$ in such a manner that the lesion region has a different color from the other region. Alternatively, the display control unit 37 may superimpose an annotation, such as an arrow indicating a lesion, on the virtual endoscopic image I-VE$_n$, and display the superimposed image. Alternatively, a user interface may be presented to make a user select whether the center of the visual range $FOV_n$ should be changed to a direction that points from the viewpoint $VP_n$ to the lesion region. Alternatively, when the visual range determination unit 35 performs ray-casting in the direction of each search vector $LV_n[\theta_p, \phi_q]$, if a ray passing through a lesion region is present, the visual range determination unit 35 may determine the visual range $FOV_n$ in such a manner that the direction of the ray passing the lesion becomes the central part of the virtual endoscopic image I-VE$_n$. As a method for detecting a lesion from a CT image representing the large intestine, a known method, such as a method for detecting a polyp by analyzing information about the shape of the wall of the large intestine by differential geometry, may be adopted (please refer to Takahiro Kimura, et al., "A Study on Automated Detection of Colonic Polyps from 3D Abdominal CT Images based on Shape (abdominal CAD) (JAMIT Frontier cosponsored by Japanese Society of Medical Imaging Technology and related societies)", Technical Research Report of IEICE, MI, Medical Image, the Institute of Electronics, Information and Communication Engineers (IEICE), Jan. 18, 2004, Vol. 103, No. 599, p.p. 29-34, and the like).

Further, in the aforementioned embodiment and the modified example, real endoscopic image I-RE$_n$ may be obtained by imaging the inside of the large intestine by using a real endoscope. The inside of the large intestine may be imaged at each viewpoint corresponding to the aforementioned viewpoint VP$_n$ on an observation path corresponding to the aforementioned observation path CL with each visual range corresponding to visual range FOV$_n$. Further, the virtual endoscopic image I-VE$_n$ and the real endoscopic image I-RE$_n$ may be displayed at the same time. Accordingly, comparative observation of the virtual endoscopic image I-VE$_n$ and the real endoscopic image I-RE$_n$ becomes possible by setting the centers of the visual ranges of the two images in the same direction. Therefore, it is possible to improve the observation efficiency. Specifically, the two images may be displayed next to each other, as illustrated in FIG. 11A. Alternatively, as illustrated in FIG. 11B, the two images may be displayed in such a manner that the centers of the visual ranges of the two images become the same. Further, the correlation between the position of the viewpoint of the virtual endoscopic image I-VE$_n$ and the position of the viewpoint of the real endoscopic image I-RE$_n$ may be identified, for example, based on a distance from the end point of the observation path.

The aforementioned embodiment and modified example are only examples, and it is not necessary that all of the descriptions are used to limit the technical scope of the present invention. Further, the system configuration, hardware configuration, process flow, module configuration, user interface, specific processing content, or the like may be modified in various manners without departing from the gist of the present invention, and such modification is still within the technical scope of the present invention.

For example, in the aforementioned embodiment, determination of visual range FOV$_n$ and generation of virtual endoscopic image I-VE$_n$ are performed based on a change in the position of the viewpoint VP$_n$. Alternatively, plural viewpoint VP$_n$ may be set in advance on observation path CL, and visual ranges FOV$_n$ may be determined at respective viewpoints VP$_n$. Further, virtual endoscopic images I-VE$_n$ at respective viewpoints VP$_n$ and with respective visual ranges FOV$_n$ may be generated in advance.

Further, in the aforementioned embodiment, the large intestine was used as an example of the tubular structure. The present invention may be used for observation of the stomach, the trachea, the tracheal branches, and the like.

What is claimed is:

1. A medical image processing apparatus comprising:
a virtual endoscopic image generation unit configured to generate a virtual endoscopic image of a tubular structure represented in a three-dimensional medical image, and which is viewed from the inside of the tubular structure;
an observation path setting unit configured to set an observation path along the tubular structure in the three-dimensional medical image;
an observation direction setting unit configured to set an observation direction of the tubular structure along the observation path;
a viewpoint setting unit configured to set a viewpoint on the observation path; and
a visual range determination unit configured to identify, based on the three-dimensional medical image, the position of a wall region of the tubular structure present in a local observation direction at the viewpoint and in the vicinity of the local observation direction, and to estimate, based on a positional relationship between the viewpoint and the wall region, a global observation direction at the viewpoint, and to determine a visual range of the virtual endoscopic image in such a manner that image information about a region located in the global observation direction with respect to the viewpoint is represented at a central part of the virtual endoscopic image,
wherein the virtual endoscopic image generation unit is configured to generate, from the three-dimensional medical image, the virtual endoscopic image representing a view within the visual range at the viewpoint,
wherein the vicinity of the local observation direction at the viewpoint is a direction from the viewpoint toward each of a plurality of search points on the observation path located on the forward side of the viewpoint along the observation direction that has been set by the observation direction setting unit, and
wherein the visual range determination unit is configured to determine, based on pixel values on a plurality of second search lines connecting the viewpoint and the plurality of search points, the direction of one of the second search lines on which the wall region is not present between the viewpoint and the search points, and the length of which is sufficiently long to satisfy a predetermined standard, as the global observation direction.

2. A medical image processing apparatus as defined in claim 1, the apparatus further comprising:
a region-of-interest extraction unit configured to extract a region of interest having a predetermined image characteristic in the tubular structure,
wherein the visual range determination unit is configured to determine the visual range further based on the region of interest.

3. A medical image processing apparatus as defined in claim 1, the apparatus further comprising:
a tubular structure extraction unit configured to extract the tubular structure from the three-dimensional medical image,
wherein the observation path setting unit is configured to extract a core line of the tubular structure that has been extracted by the tubular structure extraction unit, and to set the extracted core line as the observation path.

4. A medical image processing apparatus as defined in claim 1, the apparatus further comprising:
a display control unit configured to make a display unit display the virtual endoscopic image; and
a viewpoint position changing unit configured to change the position of the viewpoint along the observation path,
wherein the visual range determination unit is configured to determine, based on the changed viewpoint, the visual range of the virtual endoscopic image, and
wherein the virtual endoscopic image generation unit is configured to generate, based on the changed viewpoint and the visual range, the virtual endoscopic image, and
wherein the display control unit is configured to update a display on the display unit by using the virtual endoscopic image generated based on the changed viewpoint and the visual range.

5. A medical image processing apparatus as defined in claim 1, the apparatus further comprising:
a real endoscopic image obtainment unit configured to obtain a real endoscopic image at a second viewpoint on a second observation path corresponding to the observation path, and the second viewpoint corresponding to the viewpoint, by imaging the inside of the tubular structure in a second visual range corresponding to the visual range by using an endoscope; and a second display control unit configured to make a display unit display the virtual endoscopic image and the real endoscopic image at the same time.

6. A medical image processing method for generating a virtual endoscopic image of a tubular structure represented in a three-dimensional medical image, and which is viewed from the inside of the tubular structure, the method comprising the steps of:

setting an observation path along the tubular structure in the three-dimensional medical image;

setting an observation direction of the tubular structure along the observation path;

setting a viewpoint on the observation path;

identifying, based on the three-dimensional medical image, the position of a wall region of the tubular structure present in a local observation direction at the viewpoint and in the vicinity of the local observation direction;

estimating, based on a positional relationship between the viewpoint and the wall region, a global observation direction at the viewpoint;

determining a visual range of the virtual endoscopic image in such a manner that image information about a region located in the global observation direction with respect to the viewpoint is represented at a central part of the virtual endoscopic image; and generating, from the three-dimensional medical image, the virtual endoscopic image representing a view within the visual range at the viewpoint, wherein the vicinity of the local observation direction at the viewpoint is a direction from the viewpoint toward each of a plurality of search points on the observation path located on the forward side of the viewpoint along the observation direction has been set in the observation direction setting step, and wherein the visual range determining step determines, based on pixel values on a plurality of second search lines connecting the viewpoint and the plurality of search points, the direction of one of the second search lines on which the wall region is not present between the viewpoint and the search points, and the length of which is sufficiently long to satisfy a predetermined standard, as the global observation direction.

7. A non-transitory computer-readable medium storing therein a medical image processing program for causing a computer to function as:

a virtual endoscopic image generation unit configured to generate a virtual endoscopic image of a tubular structure represented in a three-dimensional medical image, and which is viewed from the inside of the tubular structure;

an observation path setting unit configured to set an observation path along the tubular structure in the three-dimensional medical image;

an observation direction setting unit configured to set an observation direction of the tubular structure along the observation path;

a viewpoint setting unit configured to set a viewpoint on the observation path; and a visual range determination unit configured to identify, based on the three-dimensional medical image, the position of a wall region of the tubular structure present in a local observation direction at the viewpoint and in the vicinity of the local observation direction, and to estimate, based on a positional relationship between the viewpoint and the wall region, a global observation direction at the viewpoint, and to determine a visual range of the virtual endoscopic image in such a manner that image information about a region located in the global observation direction with respect to the viewpoint is represented at a central part of the virtual endoscopic image, wherein the virtual endoscopic image generation unit is configured to generate, from the three-dimensional medical image, the virtual endoscopic image representing a view within the visual range at the viewpoint, wherein the vicinity of the local observation direction at the viewpoint is a direction from the viewpoint toward each of a plurality of search points on the observation path located on the forward side of the viewpoint along the observation direction that has been set by the observation direction setting unit, and wherein the visual range determination unit is configured to determine, based on pixel values on a plurality of second search lines connecting the viewpoint and the plurality of search points, the direction of one of the second search lines on which the wall region is not present between the viewpoint and the search points, and the length of which is sufficiently long to satisfy a predetermined standard, as the global observation direction.

* * * * *